Patent …

United States Patent [19]
Uebbing et al.

[11] Patent Number: 4,982,203
[45] Date of Patent: Jan. 1, 1991

[54] METHOD AND APPARATUS FOR IMPROVING THE UNIFORMITY OF AN LED PRINTHEAD

[75] Inventors: John J. Uebbing, Palo Alto; Peter H. Mahowald, Mountain View, both of Calif.

[73] Assignee: Hewlett-Packard Company, Palo Alto, Calif.

[21] Appl. No.: 377,186

[22] Filed: Jul. 7, 1989

[51] Int. Cl.⁵ .................. G01D 15/14; G01D 2/45; H04N 1/036
[52] U.S. Cl. .................. 346/107 R; 346/160
[58] Field of Search .................. 346/107 R, 108, 160, 346/153.1, 154; 358/300, 302

[56] References Cited

U.S. PATENT DOCUMENTS 4,780,731 10/1988 Creutzmann .................. 346/107 R

*Primary Examiner*—Mark J. Reinhart
*Assistant Examiner*—Scott A. Rogers

[57] ABSTRACT

An apparatus and method are provided to correct for the amount of degradation in light output of the light source used with an electrophotographic recording medium of an optical printer. The percentage amount of degradation due to aging is predicted by measuring degradation over a short interval and used to adjust the light output of the individual LEDs by pulse width modulation or current modulation so that there is a uniform light output. Similarly, the percentage amount of degradation due to temperature changes is predicted and used to adjust the light output.

25 Claims, 3 Drawing Sheets

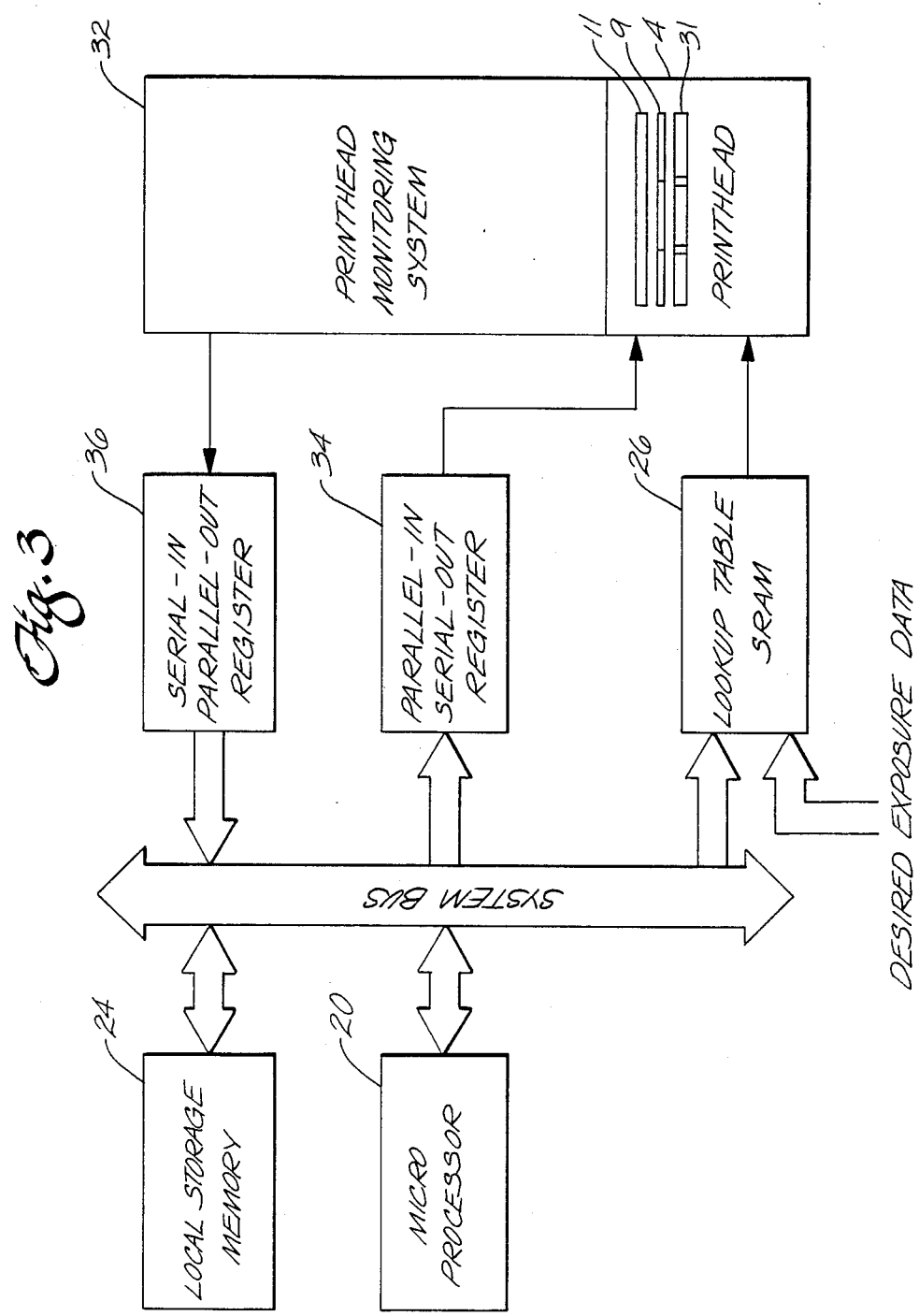

METHOD AND APPARATUS FOR IMPROVING THE UNIFORMITY OF AN LED PRINTHEAD

BACKGROUND OF THE INVENTION

Non-impact optical printers are becoming increasingly popular for producing texts and graphics, particularly in gray scale applications. In gray scale printing, multiple gradations and shades of gray can be printed in addition to black-and-white and "write white" or white-on-black printing. Gray-scale printing is typically used to create pictures rather than text.

In xerographic printers, an electrostatic charge is formed on the surface of a moving drum or belt. Selected areas of the drum or belt are discharged by exposure to light, e.g. from light emitting diodes (LEDs) or lasers. A printing toner is applied to the drum and adheres to the areas which have an electrostatic charge. The printing toner does not adhere to the discharged areas on the drum. The toner is then transferred from the areas on the drum having the electrostatic charge to a sheet of plain paper and is heat fused to the paper using well known methods. Characters are constructed in the well-known dot matrix fashion, with each character comprising a number of illuminated dots. Optical character generation devices are well known and are described in previous U.S. patents (e.g. U.S. Pat. No. 4,596,995).

In gray-scale printers, the shade of gray is determined by the amount of the electrostatic charge on the photoreceptive surface. Such printers may be used for reproducing photographs. For example, one type of optical printer uses arrays of light emitting diodes (LEDs) as the light source which exposes the photoreceptor surfaces. To create high quality images with an LED printer, each of the individual LEDs should produce the same amount of light output when they are activated by a specified signal. It is particularly important that each of the LEDs produce a uniform light output when the printer is a gray-scale printer. As the light output from each LED tends to vary significantly, a number of systems have been proposed to correct the variance in light output.

The amount of time that each LED has been on (its age) is one of two important time dependent factors which affect the amount of light output of each LED. It is believed that the rate at which the LED light output is reduced due to repeated use is unique to the particular LED. It is believed that the degradation rate is related to the number of defects or dislocations at the junctions in the crystalline lattice structure of the doped semiconductor of which LEDs are comprised as well as being related to the amount of strain in the material. Therefore, the degradation rate due repeated use or aging for an LED printhead is non-uniform between individual LEDs.

The other important time-dependent factor in the light output of the LED is the temperature of the junction. The light output decreases as the temperature increases, and by measuring the amount of decrease in light output due to temperature during manufacture and measuring the temperature during the operation of the printhead, the light output can be predicted. Compensation for the amount of degradation in light output due to temperature can therefore be accomplished. Since the amount of degradation due to temperature does not vary substantially from pixel-to-pixel, the compensation may be either performed by pulse-width modulation or by modifying the current at which the LEDs operate. With either technique, modifying the current or pulse-width modulation, it is unnecessary to measure the light output during operation, which increases the cost.

Prior art systems, such as U.S. Pat. No. 4,780,731 (Creutzmann), continuously monitor temperature and the LED light output and correct the light output at regular intervals based on the measured data. Such systems are expensive and a need has developed for a more cost effective system which does not sacrifice accuracy.

BRIEF SUMMARY OF THE INVENTION

It is, therefore, an object of the present invention to provide a low cost, highly uniform and accurate printhead suitable for precision gray scale electrophotographic printing. As an LED is used, the light output as a function of current will typically degrade due to aging. The present invention eliminates the necessity for repeated measurement of the light output as a prerequisite for correcting for the age degradation. The present invention provides a uniform LED light output to within as little as ±.15 percent error. The uniformity of the light output can be improved by approximately an order of magnitude using the present invention as compared to a LED printhead with no correction circuitry.

In addition to the array of LEDs, the system hardware of the present invention may include a microprocessor, memory and circuitry to control the current applied to the LEDs or the LED on-time during exposure, and optionally, a device for measuring light output.

To obtain the compensation for aging, before the printhead is installed in the printer, the amount of light output of each LED is measured first and then measured again after the printhead has been operating for a specified length of time. The amount of degradation is defined using the difference between the two measurements of the light output. After the printhead is installed, only the aging is measured by measuring the amount of time the printhead is on. The light output of the LEDs is adjusted based on predictions made from measuring the aging. Predicting the amount of degradation for each pixel is accomplished using a mathematical relationship between the LED on-time and the percentage amount of degradation. The predicted amount of degradation for each LED is stored in memory located on the printhead.

To obtain the amount of compensation for degradation in light output due to temperature increases, the average amount of light output for the printhead is measured at various temperatures before the printhead is installed, and a table of values of light output at various temperatures is stored in memory. After the printhead is installed, the temperature is measured and the light output is adjusted using the values stored in memory from the pre-installation measurements of temperature versus light output.

The light output can be expressed mathematically as a function of the current, the temperature, a current non-linearity coefficient, and a temperature dependent coefficient. A mathematical equation relating light output to current and temperature is used to predict the amount of correction needed at a later time to obtain uniformity. At least two different values of current and light output are needed to solve the equation for the current non-linearity coefficient and the temperature dependent coefficient.

The amount of correction required for each LED to achieve uniformity with all the other LEDs is computed using the equation in a software program. The parameters of the mathematical equations for each LED are stored in memory. The LED exposure-time (i.e. duty factor) and the drive current of the printhead system are adjusted using the correction factor which was computed by the microprocessor.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 3 is a block diagram illustrating the interconnection of the control electronics and the printhead of the present invention;

DETAILED DESCRIPTION

Figure 1:
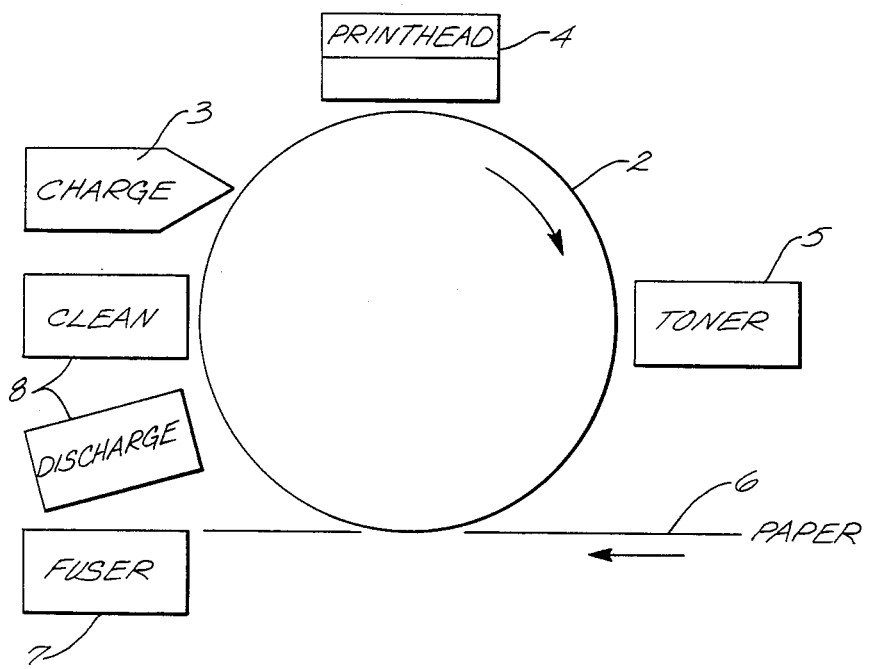
FIG. 1 illustrates, in block diagram form, an exemplary optical xerographic printing apparatus.
Figure 4:
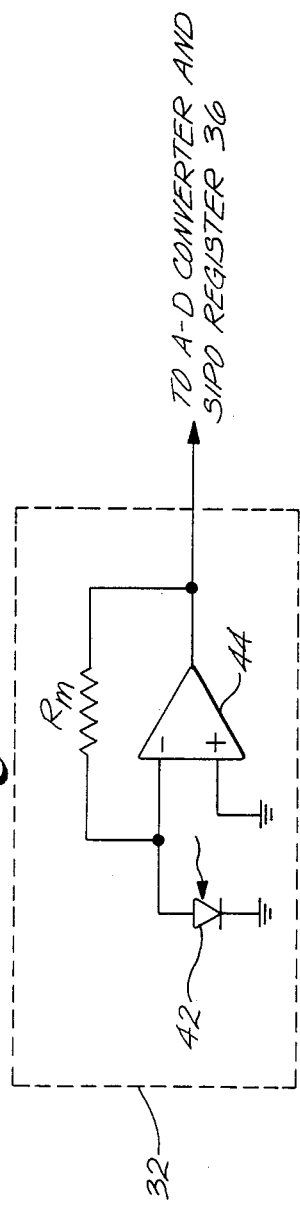
FIG. 4 is an exemplary light output measurement circuit.

An exemplary, conventional, light emitting diode (LED) printer is shown in a block diagram in FIG. 1 to provide an overview of the environment of the present invention. A selected area of a rotating drum 2 receives an electrostatic charge from a charging station 3. Exposure to light from a printhead 4 causes selected areas within the charged area to be discharged. A printing toner 5 is applied to the drum and adheres to the areas which are charged and will not adhere to those areas which are not charged or have been discharged. Characters or images may be constructed by charging and then darkening appropriate pixels on the drum with toner. The toner is then transferred and heat-fused to the paper 6 at a fusing drum 7. The surface of the drum is thoroughly discharged and cleaned of any remaining toner at a cleaning station 8 before being recharged.

Figure 2:
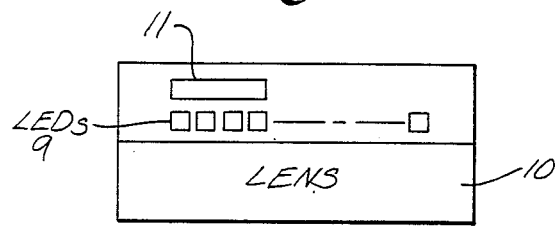
FIG. 2 is an enlargement of the printhead portion of the block diagram shown in FIG. 1.

A block diagram of an exemplary printhead 4 is illustrated in FIG. 2 with a row of LEDs 9, a lens 10 to focus the light emitted by the LEDs, and circuitry to control the actuation of the LEDs fabricated on an integrated circuit 11. The integrated circuit 11 receives power from a current supply voltage, $V_c$, which is typically five volts.

The interconnection of the major hardware components used in this invention can be seen in FIG. 3. A microprocessor 20 is interconnected to various memory elements, i.e. a look up table static random access memory (SRAM) 26, and a local memory storage 24, through the system bus 28. The microprocessor 20 is also interconnected to the printhead 4 through the system bus. The microprocessor is connected to the printhead monitoring system 32 through a parallel-in, serial-out (PISO) register 34. The printhead monitoring system measures the amount of light output of at least some of the LEDs and the temperature of various parts of the printhead. The signal representing the measured amount of light output is input to the microprocessor through a serial-in, parallel-out (SIPO) register 36.

Figure 5:
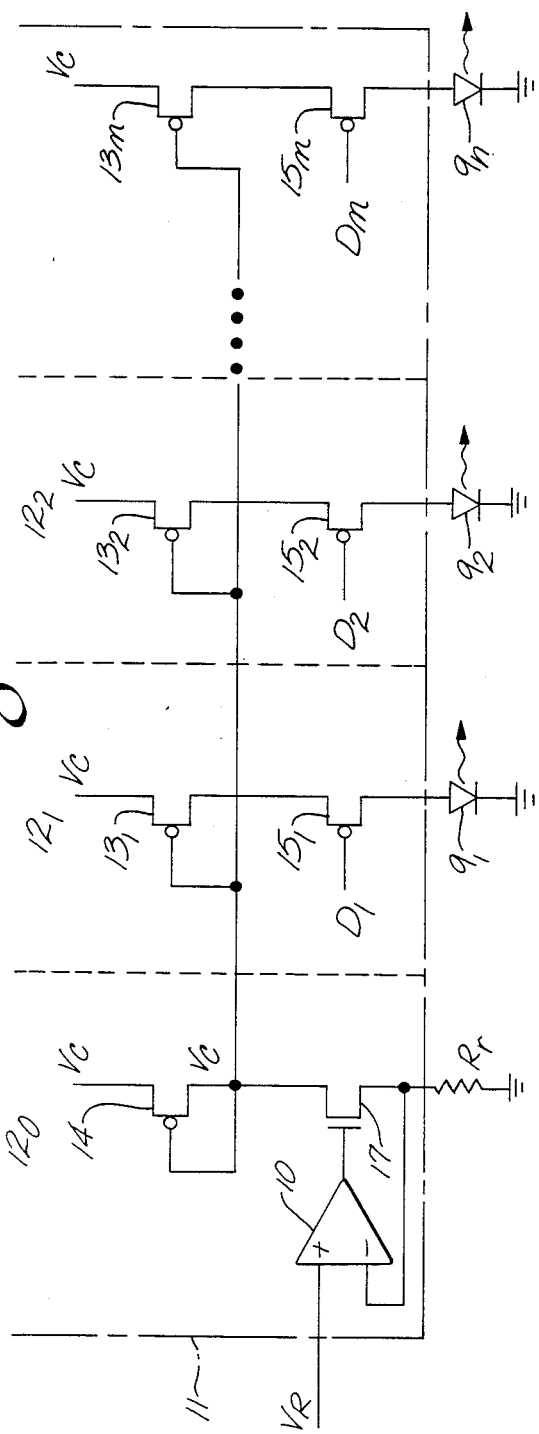
FIG. 5 a circuit diagram illustrating an exemplary embodiment of the LED driver for the printhead of the present invention.

The structure and operation of the printhead 30 will now be discussed. Referring to FIG. 5, power is supplied to a array of LEDs 9 (only one row is shown) from an integrated circuit (IC) chip 11 which is in electrical connection with, and mounted in close proximity to, the LEDs. Each of the cells $12_0, 12_1, 12_2, \ldots 12_n$ cells are circuits for controlling each LED, $9_1, 9_2, \ldots 9_n$. The LEDs are driven by output drivers which may advantageously be p-channel field effect transistors (FETs) $13_1, 13_2, \ldots 13_n$ and switching FETs $15_1, 15_2, \ldots 15_n$. Transistor pairs $13_1$ and $15_1$, $13_2$ and $15_2$, etc. are connected in series with each other and the LEDs. By having the gates of all the output driver transistors 13 connected to the chip reference voltage $V_c$, the magnitude of the current through each driver transistor is substantially identical.

Varying the system reference voltage, $V_R$ controls the light output of all the LEDs in the array. The instantaneous current through each of the LEDs is $V_R$ divided by $R_r$, so that increasing the voltage $V_R$ increases the current flow through the LED and increases the light output. Thus, $V_R$ can be set to a desired level which also sets the magnitude of the current. Varying $V_R$ is one method for compensating for the degradation in light output for variations in temperature if is assumed that the temperature of all the LEDs in the array is approximately the same. Alternatively, pulse width modulation can be used to separately control groups of LEDs (which can be as small as two) using the different measured temperatures of the LED groups.

The first cell of the printhead circuit, $12_0$, sets the current through the LEDs. Cell $12_0$ includes an operational amplifier 10 (also referred to as an "op-amp"). The output of the op-amp 10 is input to the gate of an n-channel, current setting FET 17. The source of the current setting FET 17 is the non-inverting input of the op-amp 10. In this configuration the op-amp increases its output voltage, until the inverting input to the op-amp is equal to $V_R$. When the voltage at the source 19 of the current setting FET 17 is equal to the system reference voltage, $V_R$, the voltage at its drain 18 is equal to $V_c$, the chip reference voltage. The current at the source 19 of the current setting FET 17 is the same as the current at the drain 18, which is equal to $V_R/R_r$. The current through each of the LEDs 9 is the same as the current at the source 18 of the current setting FET 17 and equal to $V_R/R_r$ when there is an actuating pulse D at the gate of each driver FET 15. Global changes in the current may be accomplished by varying the system reference voltage $V_R$, or the reference resistor $R_r$.

In contrast to the system reference voltage $V_R$ which controls the overall printhead current, adjustments to the pixel-by-pixel light output are made by pulse width modulation: Individual LEDs are controlled by regulating their exposure time, that is, the amount of time each LED is on. The switching FETs 15 (FIG. 5) act as switches in response to the presence or absence of a data signal $D_1, D_2, \ldots D_n$ applied to the respective gates of the switching FETs 15. Each of the signals $D_1, D_2, \ldots D_n$ is typically a series of square-wave pulses which turn the switching transistors 15 "on" or "off". The signals have varying pulse widths which are equal to the exposure times for each LED.

In order to provide compensation for the variations in light output between LEDs due to aging, the amount of degradation in light output is predicted. By predicting the percentage amount of degradation, $D_g$, in light output and increasing the exposure time by the same percentage, compensation for the amount of degradation due to varying effects of age on each LED is accomplished.

The percentage degradation is defined in terms of the light output, q, at time t and time 0:

$$\text{Percentage degradation} = D_g = \left[1 - \frac{q(t)}{q(0)}\right]100\% \quad (2)$$

For example, if the first measurement of the light output of LED using a photodetector is 100 nanovolts and the second measurement of the same LED is 90, the percentage amount of degradation is 10 percent.

$$D_g = [1 - (q(t)/q(0))] \, 100\% = [1-90/100] \, 100\% = 10\%$$

Therefore, the pulse width of the actuating pulse $D_1$, which is equal to the exposure time, is increased by 10% to compensate. The actuating pulse for the second LED, $D_2$, may be corrected by 9.5%, for example, and so on. The different values for $D_1, D_2, ...D_n$ are stored in a look-up table in memory for later use in controlling the exposure time of the LEDs. A fast static RAM 26 (SRAM) may advantageously be used as the memory device for storing the look-up table. In gray scale printers it is advantageous to place the look-up table within the picture data processing subsystem. In gray-scale printing applications, the different values for $D_1...D_n$ are selected using the gray-scale exposure data.

It has been discovered that the percentage degradation as a function of time may be modeled by the equation:

$$D_g = k_D t^{1/3} \quad (3)$$

where $k_D$ is a constant which is a characteristic of each LED and t is the amount of time that the printhead has been operating. The constancy of $k_D$ for each LED allows the future light output of a specific LED to be accurately predicted when the LED age is known. Each LED has a different value for $k_D$. The value of $k_D$ for each LED may be calibrated during the manufacture of the printhead by measuring the degradation at two different measurement times before the product is released from production.

The percentage amount of degradation $D_g$ is predicted using equation (3) by substituting the amount of time the printhead has been operating for the variable, t. It will be appreciated that the operation time of the printhead may be determined in a number of different ways. One way is to approximate the operation time by keeping a count of the number of pages and estimating the resulting usage of each LED from number of pages.

The microprocessor 20 calculates $k_D t^{1/3}$ by retrieving the values of $k_D$ stored in the look-up table 26 for each LED. The system software multiplies each value of $k_D$ by the cube-root of the operating time, $t^{1/3}$ to obtain a value for the percentage degradation, $D_g$, for each LED.

The duty factor (the amount of time on divided by the amount of time off) of the LEDs is adjusted by increasing the pulse width of the actuating pulses D for each LED by the percentage degradation, $D_g$, to compensate for the degradation in output due to aging. Thus, the pulse widths of the signals $D_n$ are modulated to compensate for the amount of aging that each LED has experienced.

The vast majority of the LED's follow equation (3). However, a certain small percentage require additional correction. The LEDs which require more correction than predicted by Equation (3) can be located before manufacture and either removed from use or an extra correction made in order to increase the accuracy.

Another way to estimate the amount of age-caused degradation of the LEDs, without using Equation (3), is to measure the degradation in light output of a few selected LEDs, e.g. those in close proximity to the center of the printhead. The light output may be measured at repeated intervals and the degradation measured during operation of the printer between the printing of each page. After a preselected time period, which has been found to be from a few minutes to a day of printhead operation, the light output of each of the selected LEDs may again be measured which will have decreased due to aging of the LEDs. The measured percentage amount of degradation is then used to increase the pulse width(s) of signal D by the same percentage to compensate for the aging.

Compensation for temperature variations will now be discussed. Increases in ambient temperature result in global degradation in the light output of all the LEDs. Before the printhead is installed, the system is calibrated by taking measurements of light output of each LED at two different amounts of current using the equation:

$$\frac{q}{k} = \frac{x}{2} - \sqrt{\left(\frac{x}{2}\right)^2 + (x I)} + I \quad (4)$$

where q is the light output, I is the current, k is the temperature-dependent coefficient, x is the current non-linearity coefficient. By substituting the two measured values of q and I, the values of the temperature dependent coefficient k and the current non-linearity coefficient x can be determined. The values of k and x are stored in memory on the printhead.

The temperature is continuously monitored with a conventional temperature sensor 31. For example, a temperature transducer, which produces an output voltage proportional to the temperature, may be used. If the temperature has changed after a predetermined operation time, e.g. 2 minutes, a new value for the temperature dependent "efficiency" coefficient, k, is calculated from equation (5) relating k to the temperature:

$$k = k_o e^{-T/T_0} \quad (5)$$

where T is the measured temperature and $T_o$ and $k_o$ are constants. Typically, $T_o$ is equal to 111° C.. Equation (4) is solved for the current I and the calculated value of k from equation (5) is substituted for k and a new value for the current I is calculated by the system software. The value of the reference voltage $V_R$ may be adjusted by a global correction signal generated by the microprocessor 20. The magnitude of the instantaneous current flowing through all the LEDs is changed to correspond to the newly-calculated value of I, thereby effecting a global change in the light output.

Alternatively, because of the substantial computation time required for the software to make the necessary calculation using Equation (4) an approximation of the change in current, I, required to compensate for the increase in temperature, T, may be made to reduce the calculation time:

$$\Delta I = \frac{\frac{\partial g}{\partial T}}{\frac{\partial g}{\partial I}} \Delta T \quad (6)$$

where $\bar{q}$ is the average light output for the printhead. The software approximates the partial derivatives in equation (6) by calculating the slope of equation (4). A similar approximation using partial derivatives may be used in lieu of Equation (3) if minimizing the computation time is more desirable than maximizing the accuracy.

The values for $V_R$ and/or $R_r$ are selected to provide a little more current than is required to produce the maximum amount of desired light output so that the values of $D_n$, the pulse widths, will always be less than 100%. It will be appreciated that $V_R/R_r$ is the typical instantaneous current of the printhead circuit, while the pulse width-modulated current through the LEDs results from the varying pulse lengths of the signals D.

If the embodiment in which the light output of a few selected LEDs is periodically measured is used, there are a number of different circuits which can be used for measurement of the light output. Measurement of the light output is generally accomplished using photoconductive devices, such as a photodiode, placed in sufficient proximity to each LED to receive the light from the LEDs. An exemplary measurement circuit is shown in FIG. 7. A photodiode 42 is connected in series with a resistor $R_m$. Op-amp 44 measures the voltage across the resistor which is proportional to the light output.

The invention has been described in detail with particular reference to preferred embodiments thereof. However, it will be understood that variations and modifications may be effected within the spirit and scope of the invention.

What is claimed is:

1. An apparatus for improving the uniformity of a light emitting diode array printhead comprising:
   means for predicting the amount of degradation in light output of each light emitting diode as a function of time;
   means for generating correction data to compensate for he amount of degradation in the light output of each light emitting diode as a function of time using said predicted amount of degradation; and
   means for adjusting the amount of light emitted by each light emitting diode using said correction data and the operating time of the light emitting diodes.

2. The apparatus of claim 1 further including:
   means for measuring the temperature of said printhead and generating a temperature signal representing the measured temperature;
   means for generating a correction factor signal using said temperature signal; and
   means for controlling the amount of light output of all of the light emitting diodes as a group using said correction factor signal whereby said light output is increased to compensate for the degradation in light output caused by increases in temperature of the printhead.

3. The apparatus of claim 1 wherein the means for predicting the amount of degradation includes a means for measuring the light output of a number of selected light emitting diodes less than the total number of light emitting diodes.

4. An apparatus for improving the uniformity of a light emitting diode array printhead comprising:
   means for predicting the amount of degradation in light output of each light emitting diode comprising means for calculating $k_d t^{1/3}$ wherein $k_d$ is a constant for each LED and t is the operation time of the printhead;
   means for generating correction data to compensate for the amount of degradation in the light output of each light emitting diode using said predicted amount of degradation; and
   means for adjusting the amount of light emitted by each light emitting diode using said correction data.

5. The apparatus of claim 1 further comprising:
   means for measuring the temperature of a selected group of light emitting diodes and generating a temperature signal representing the measured temperature for each of said groups; and
   means for adjusting the amount of light emitted by each of said groups of light emitting diode using said temperature signal.

6. The apparatus of claim 2 wherein the means for predicting the amount of degradation includes a means for measuring the light output of a number of selected light emitting diodes less than the total number of light emitting diodes.

7. The apparatus of claim 2 wherein the means for predicting the amount of degradation comprises means for calculating $k_d t^{1/3}$ wherein $k_d$ is a constant for each LED and t is the operation time of the printhead.

8. The apparatus of claim 2 wherein said means for controlling the amount of light output includes a means for calculating the temperature-dependent coefficient, from said temperature signal and a means for calculating the current required to drive the light emitting diodes to compensate for a change in temperature of the light emitting diodes.

9. The apparatus of claim 2 wherein the light emitting diode array includes a system reference voltage and said means for controlling the amount of light output includes a means for adjusting said system reference voltage.

10. The apparatus of claim 8 wherein said means for calculating said temperature dependent coefficient and said current comprises a microprocessor and a software program.

11. The apparatus of claim 9 wherein said means for adjusting said system reference voltage includes a microprocessor.

12. The apparatus of claim 10 wherein $k_o e^{-T/T_o}$ is calculated to obtain the temperature dependent coefficient where $T_o$ and $k_o$ are constants and T is said temperature.

13. The apparatus of claim 4 wherein said calculating means includes a microprocessor and a software program.

14. A method of improving the uniformity of a light emitting diode array printhead having a means for controlling the light output of each LED, said method comprising the steps of:
   measuring the amount of degradation in light output of a selected group of light emitting diodes after a preselected time period;
   using said measured amount of degradation to predict the amount of correction required for each light emitting diode to compensate for the amount of degradation in the light output of each light emitting diode occurring at times later than the time at which the degradation was measured; and adjusting the light output of each light emitting diode using said predicted amount of correction for each light emitting diode and the operating time of the light emitting diodes.

15. The method of claim 14 wherein the adjusting step is accomplished by varying the input of said means for controlling the amount of light output of each light emitting diode.

16. The method of claim 14 wherein the adjusting step is accomplished by pulse width modulation of each light emitting diode.

17. The method of claim 13 further including:
measuring the temperature of said printhead; and
adjusting the light output of light emitting diodes as a group using said measured temperature.

18. The method of claim 14 further including:
measuring the temperature of a selected group of light emitting diodes and generating a temperature signal representing the measured temperature for each of said groups; and adjusting the amount of light emitted by each of said groups using said temperature signal.

19. The method of claim 18 wherein said adjusting step is accomplished by pulse width modulation.

20. The method of claim 17 further including:
determining the values for the temperature dependent coefficient and the current non-linearity coefficient.

21. A method for compensating for non-uniform age degradation of a plurality of light emitting diodes comprising the steps of:
measuring the light output from light emitting diodes after the light emitting diodes have been on for a first interval of usage;
predicting the aging of each light emitting diode after an additional interval of usage;
measuring the time of an additional interval of usage of the light emitting diodes; and applying a selected additional increment of current to each light emitting diode after such an additional interval of usage and based on the predicted aging of each light emitting diode for obtaining substantially uniform light output from each of the light emitting diodes.

22. The method of claim 21 wherein said additional increment of current is applied by increasing the on-time of the light-emitting diode.

23. The apparatus of claim 1 wherein the means for correction data comprises measuring the amount of time each light emitting diode has been operating.

24. Apparatus for improving the uniformity of light output from a plurality of light emitting diodes comprising the steps of:
means for determining the amount of time at least a portion of the light emitting diodes have been operating;
means for storing a time dependent correction factor for at least a portion of the light emitting diodes;
means for determining the degradation of each such light emitting diode as a function of a stored correction factor and the time the light emitting diode has been operating; and
means for adjusting the duty cycle of each light emitting diode as a function of the degradation determined.

25. A method for correcting for aging of light emitting diodes comprising the steps of:
measuring the light output of a light emitting diode;
measuring the light output of the light emitting diode after an interval of operation;
determining a correction factor based on the degradation of light output between the two measurements;
storing the correction factor;
determining an additional time the light emitting diode has been in operation;
predicting the degradation of light output from the light emitting diode as a function of the stored correction factor and the additional operating time; and
adjusting the duty cycle of the light emitting diode for compensating for the predicted degradation.

* * * * *